(12) United States Patent
Nayak

(10) Patent No.: US 12,256,464 B2
(45) Date of Patent: Mar. 18, 2025

(54) APPARATUS, METHOD, AND COMPUTER PROGRAM FOR UPDATING USER SUBSCRIPTION PROFILES

(71) Applicant: NOKIA SOLUTIONS AND NETWORKS OY, Espoo (FI)

(72) Inventor: Ashok Kumar Nayak, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 385 days.

(21) Appl. No.: 17/622,279

(22) PCT Filed: Jun. 24, 2019

(86) PCT No.: PCT/EP2019/066624
§ 371 (c)(1),
(2) Date: Dec. 23, 2021

(87) PCT Pub. No.: WO2020/259791
PCT Pub. Date: Dec. 30, 2020

(65) Prior Publication Data
US 2022/0248208 A1    Aug. 4, 2022

(51) Int. Cl.
*H04L 65/10* (2022.01)
*H04L 65/1045* (2022.01)
*H04W 8/18* (2009.01)

(52) U.S. Cl.
CPC ......... *H04W 8/183* (2013.01); *H04L 65/1045* (2022.05)

(58) Field of Classification Search
CPC ...................................................... H04W 8/18
See application file for complete search history.

(56) References Cited

U.S. PATENT DOCUMENTS

| 10,327,196 | B2 * | 6/2019 | Yerrabommanahalli ................... H04W 40/24 |
| 2018/0026733 | A1 * | 1/2018 | Yang .................... H04N 21/235 725/33 |
| 2018/0083828 | A1 * | 3/2018 | Cartaya ............... H04L 41/0895 |

OTHER PUBLICATIONS

International Search Report and Written Opinion dated Feb. 13, 2020 corresponding to International Patent Application No. PCT/EP2019/066624.
3GPP TR 23.820 V9.0.0 (Sep. 2009), Technical Report, 3rd Generation Partnership Project; Technical Specification Group Core Network and Terminals; Study on IMS Restoration Procedures (Release 9), Sep. 1, 2009, XP050363853.
3GPP TS 23.380 V16.0.0 (Mar. 2019), Technical Specification, 3rd Generation Partnership Project; Technical Specification Group Core Network and Terminals; IMS Restoration Procedures (Release 16), Mar. 22, 2019, XP051722811.

(Continued)

*Primary Examiner* — Michael T Vu
(74) *Attorney, Agent, or Firm* — SQUIRE PATTON BOGGS (US) LLP

(57) ABSTRACT

An apparatus comprising: at least one processor; and at least one memory including computer program code; the at least one memory and the computer program code configured to, with the at least one processor, cause the apparatus at least to: receive (806), by a first function, subscription information relating to a user equipment from a server in response to the first function being restored; and sending (808), by the first function, the subscription information relating to the user equipment to a second function.

14 Claims, 12 Drawing Sheets

(56) References Cited

OTHER PUBLICATIONS

3GPP TS 24.229 V16.1.0 (Mar. 2019), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 16), Mar. 2019.
European Office Action issued in corresponding European Patent Application No. 19 733 728.0-1206 on Dec. 5, 2024.

\* cited by examiner

APPARATUS, METHOD, AND COMPUTER PROGRAM FOR UPDATING USER SUBSCRIPTION PROFILES

FIELD OF THE DISCLOSURE

The present disclosure relates to an apparatus, a method, and a computer program for managing subscription information relating to a user in a subsystem (e.g. an internet protocol multimedia subsystem).

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising at least one processor and at least one memory including computer code for one or more programs, the at least one memory and the computer code configured, with the at least one processor, to cause the apparatus at least to: receive, by a first function, subscription information relating to a user equipment from a server in response to the first function being restored; and send, by the first function, the subscription information relating to the user equipment to a second function.

The first function may be a serving call session control function.

The server may be a home subscription server.

The second function may be a proxy call session control function.

The restoration of the first function may be triggered by a call to or from the user equipment.

The restoration of the first function may be triggered by a call originating from the user equipment.

The restoration of the first function may be triggered by a call terminating at the user equipment.

The subscription information relating to the user equipment may comprise a user equipment identity.

The subscription information relating to the user equipment may comprise a service priority.

The subscription information relating to the user equipment may comprise an extended priority.

The at least one memory and the computer program code may be configured to, with the at least one processor, cause the apparatus at least to: send, by the first function, the subscription information relating to the user equipment to the second function along with previous subscription information relating to the user equipment.

The subscription information relating to the user equipment may be sent to the second function along with previous subscription information relating to the user equipment in a notify message.

The at least one memory and the computer program code may be configured to, with the at least one processor, cause the apparatus at least to, prior to the restoration of the first function: receive, by the first function, subscription information relating to the second function from the second function; and send, by the first function, the subscription information relating to the second function to the server.

The at least one memory and the computer program code may be configured to, with the at least one processor, cause the apparatus at least to, in response to the restoration of the first function: receive, by the first function, the subscription information relating to the second function from the server; and send, by the first function, the subscription information relating to the user equipment to the second function based on the subscription information relating to the second function.

The at least one memory and the computer program code may be configured to, with the at least one processor, cause the apparatus at least to, prior to the restoration of the first function: fail to receive, by the first function, the subscription information relating to the user equipment from the server in response to the first function being down or being restarted.

According to an aspect there is provided an apparatus comprising circuitry configured to: receive, by a first function, subscription information relating to a user equipment from a server in response to the first function being restored; and send, by the first function, the subscription information relating to the user equipment to a second function.

The first function may be a serving call session control function.

The server may be a home subscription server.

The second function may be a proxy call session control function.

The restoration of the first function may be triggered by a call to or from the user equipment.

The restoration of the first function may be triggered by a call originating from the user equipment.

The restoration of the first function may be triggered by a call terminating at the user equipment.

The subscription information relating to the user equipment may comprise a user equipment identity.

The subscription information relating to the user equipment may comprise a service priority.

The subscription information relating to the user equipment may comprise an extended priority.

The apparatus may comprise circuitry configured to: send, by the first function, the subscription information relating to the user equipment to the second function along with previous subscription information relating to the user equipment.

The subscription information relating to the user equipment may be sent to the second function along with previous subscription information relating to the user equipment in a notify message.

The apparatus may comprise circuitry configured to, prior to the restoration of the first function: receive, by the first function, subscription information relating to the second function from the second function; and send, by the first function, the subscription information relating to the second function to the server.

The apparatus may comprise circuitry configured to, in response to the restoration of the first function: receive, by the first function, the subscription information relating to the second function from the server; and send, by the first function, the subscription information relating to the user equipment to the second function based on the subscription information relating to the second function.

The apparatus may comprise circuitry configured to, prior to the restoration of the first function: fail to receive, by the first function, the subscription information relating to the user equipment from the server in response to the first function being down or being restarted.

According to an aspect there is provided an apparatus comprising means for: receiving, by a first function, subscription information relating to a user equipment from a server in response to the first function being restored; and sending, by the first function, the subscription information relating to the user equipment to a second function.

The first function may be a serving call session control function.

The server may be a home subscription server.

The second function may be a proxy call session control function.

The restoration of the first function may be triggered by a call to or from the user equipment.

The restoration of the first function may be triggered by a call originating from the user equipment.

The restoration of the first function may be triggered by a call terminating at the user equipment.

The subscription information relating to the user equipment may comprise a user equipment identity.

The subscription information relating to the user equipment may comprise a service priority.

The subscription information relating to the user equipment may comprise an extended priority.

The apparatus may comprise means for: sending, by the first function, the subscription information relating to the user equipment to the second function along with previous subscription information relating to the user equipment.

The subscription information relating to the user equipment may be sent to the second function along with previous subscription information relating to the user equipment in a notify message.

The apparatus may comprise means for: receiving, by the first function, subscription information relating to the second function from the second function; and sending, by the first function, the subscription information relating to the second function to the server.

The apparatus may comprise means for: receiving, by the first function, the subscription information relating to the second function from the server; and sending, by the first function, the subscription information relating to the user equipment to the second function based on the subscription information relating to the second function.

The apparatus may comprise means for: failing to receive, by the first function, the subscription information relating to the user equipment from the server in response to the first function being down or being restarted.

According to an aspect there is provided a method comprising: receiving, by a first function, subscription information relating to a user equipment from a server in response to the first function being restored; and sending, by the first function, the subscription information relating to the user equipment to a second function.

The first function may be a serving call session control function.

The server may be a home subscription server.

The second function may be a proxy call session control function.

The restoration of the first function may be triggered by a call to or from the user equipment.

The restoration of the first function may be triggered by a call originating from the user equipment.

The restoration of the first function may be triggered by a call terminating at the user equipment.

The subscription information relating to the user equipment may comprise a user equipment identity.

The subscription information relating to the user equipment may comprise a service priority.

The subscription information relating to the user equipment may comprise an extended priority.

The method may comprise: sending, by the first function, the subscription information relating to the user equipment to the second function along with previous subscription information relating to the user equipment.

The subscription information relating to the user equipment may be sent to the second function along with previous subscription information relating to the user equipment in a notify message.

The method may comprise: receiving, by the first function, subscription information relating to the second function from the second function; and sending, by the first function, the subscription information relating to the second function to the server.

The method may comprise: receiving, by the first function, the subscription information relating to the second function from the server; and sending, by the first function, the subscription information relating to the user equipment to the second function based on the subscription information relating to the second function.

The method may comprise: failing to receive, by the first function, the subscription information relating to the user equipment from the server in response to the first function being down or being restarted.

According to an aspect there is provided a computer program comprising computer executable code which when run on at least one processor is configured to: receive, by a first function, subscription information relating to a user equipment from a server in response to the first function being restored; and send, by the first function, the subscription information relating to the user equipment to a second function.

The first function may be a serving call session control function.

The server may be a home subscription server.

The second function may be a proxy call session control function.

The restoration of the first function may be triggered by a call to or from the user equipment.

The restoration of the first function may be triggered by a call originating from the user equipment.

The restoration of the first function may be triggered by a call terminating at the user equipment.

The subscription information relating to the user equipment may comprise a user equipment identity.

The subscription information relating to the user equipment may comprise a service priority.

The subscription information relating to the user equipment may comprise an extended priority.

The computer program may comprise computer executable code which when run on at least one processor is configured to: send, by the first function, the subscription information relating to the user equipment to the second function along with previous subscription information relating to the user equipment.

The subscription information relating to the user equipment may be sent to the second function along with previous subscription information relating to the user equipment in a notify message.

The computer program may comprise computer executable code which when run on at least one processor is configured to o, prior to the restoration of the first function: receive, by the first function, subscription information relating to the second function from the second function; and send, by the first function, the subscription information relating to the second function to the server.

The computer program may comprise computer executable code which when run on at least one processor is configured to, in response to the restoration of the first function: receive, by the first function, the subscription information relating to the second function from the server; and send, by the first function, the subscription information relating to the user equipment to the second function based on the subscription information relating to the second function.

The computer program may comprise computer executable code which when run on at least one processor is configured to, prior to the restoration of the first function: fail to receive, by the first function, the subscription information relating to the user equipment from the server in response to the first function being down or being restarted.

According to an aspect there is provided an apparatus comprising at least one processor and at least one memory including computer code for one or more programs, the at least one memory and the computer code configured, with the at least one processor, to cause the apparatus at least to: receive, by a second function, subscription information relating to a user equipment from a first function in response to the first function being restored.

The at least one memory and the computer program code configured to, with the at least one processor, cause the apparatus at least to, prior to the first function being restored: send, by the second function, subscription information relating to the second function to the first function.

According to an aspect there is provided an apparatus comprising circuitry configured to: receive, by a second function, subscription information relating to a user equipment from a first function in response to the first function being restored.

The apparatus may comprise circuitry configured to, prior to the first function being restored: send, by the second function, subscription information relating to the second function to the first function.

According to an aspect there is provided an apparatus comprising means for: receiving, by a second function, subscription information relating to a user equipment from a first function in response to the first function being restored.

The apparatus may comprise means for, prior to the first function being restored: sending, by the second function, subscription information relating to the second function to the first function.

According to an aspect there is provided a method comprising: receiving, by a second function, subscription information relating to a user equipment from a first function in response to the first function being restored.

The method may comprise, prior to the first function being restored: sending, by the second function, subscription information relating to the second function to the first function.

According to an aspect there is provided a computer program comprising computer executable code which when run on at least one processor is configured to: receive, by a second function, subscription information relating to a user equipment from a first function in response to the first function being restored.

The computer program may comprise computer executable code which when run on at least one processor is configured to, prior to the first function being restored: send, by the second function, subscription information relating to the second function to the first function.

According to an aspect there is provided an apparatus comprising at least one processor and at least one memory including computer code for one or more programs, the at least one memory and the computer code configured, with the at least one processor, to cause the apparatus at least to: send, by a server, subscription information relating to a user equipment to a first function in response to the first function being restored.

The at least one memory and the computer program code may be configured to, with the at least one processor, cause the apparatus at least to: receive, by the server, the subscription information relating to the user equipment from an operator.

The at least one memory and the computer program code may be configured to, with the at least one processor, cause the apparatus at least to: receive, by the server, subscription information relating to the second function from the second function.

The at least one memory and the computer program code may be configured to, with the at least one processor, cause the apparatus at least to: send, by the server, the subscription information relating to the user equipment along with the subscription information relating to the second function to the first function in response to the first function being restored.

According to an aspect there is provided an apparatus comprising circuitry configured to: send, by a server, subscription information relating to a user equipment to a first function in response to the first function being restored.

The apparatus may comprise circuitry configured to, with the at least one processor, cause the apparatus at least to: receive, by the server, the subscription information relating to the user equipment from an operator.

The apparatus may comprise circuitry configured to, with the at least one processor, cause the apparatus at least to:

receive, by the server, subscription information relating to the second function from the second function.

The apparatus may comprise circuitry configured to, with the at least one processor, cause the apparatus at least to: send, by the server, the subscription information relating to the user equipment along with the subscription information relating to the second function to the first function in response to the first function being restored.

According to an aspect there is provided an apparatus comprising means for: sending, by a server, subscription information relating to a user equipment to a first function in response to the first function being restored.

The apparatus may comprise means for: receiving, by the server, the subscription information relating to the user equipment from an operator.

The apparatus may comprise means for: receiving, by the server, subscription information relating to the second function from the second function.

The apparatus may comprise means for: sending, by the server, the subscription information relating to the user equipment along with the subscription information relating to the second function to the first function in response to the first function being restored.

According to an aspect there is provided a method comprising: sending, by a server, subscription information relating to a user equipment to a first function in response to the first function being restored.

The method may comprise: receiving, by the server, the subscription information relating to the user equipment from an operator.

The method may comprise: receiving, by the server, subscription information relating to the second function from the second function.

The method may comprise: sending, by the server, the subscription information relating to the user equipment along with the subscription information relating to the second function to the first function in response to the first function being restored.

According to an aspect there is provided a computer program comprising computer executable code which when run on at least one processor is configured to: send, by a server, subscription information relating to a user equipment to a first function in response to the first function being restored.

The computer program may comprise computer executable code which when run on at least one processor is configured to: receive, by the server, the subscription information relating to the user equipment from an operator.

The computer program may comprise computer executable code which when run on at least one processor is configured to: receive, by the server, subscription information relating to the second function from the second function.

The computer program may comprise computer executable code which when run on at least one processor is configured to: send, by the server, the subscription information relating to the user equipment along with the subscription information relating to the second function to the first function in response to the first function being restored.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AUSF: Authentication Server Function
AMF: Access Management Function
AVP: Attribute Value Pair
CU: Centralized Unit
DN: Data Network
DU: Distributed Unit
ETS: Emergency Telecommunication Service
GNB: gNodeB
GSM: Global System for Mobile communication
HSS: Home Subscriber Server
I-CSCF: Interrogating Call Session Control Function
IMPI: IMS Private Identity
IMPU: IMS Public Identity
IMS: IP Multimedia Subsystem
IoT: Internet of Things
IP: Internet Protocol
IRS: Implicit Registration Set
LTE: Long Term Evolution
NEF: Network Exposure Function
NR: New Radio
MCPTT: Mission Critical Push To Talk
MS: Mobile Station
MTC: Machine Type Communication
P-CSCF: Proxy Call Session Control Function
PPA: Push Profile Request
PPR: Push Profile Answer
RAM: Random Access Memory
RAN: Radio Access Network
RCS: Rich Communication Service
ROM: Read Only Memory
RPH: Resource Priority Header
SAA: Server Assignment Answer
SAR: Server Assignment Request
S-CSCF: Serving Call Session Control Function
SMF: Session Management Function
UDM: User Data Management
UE: User Equipment
UMTS: Universal Mobile Telecommunication System
USB: Universal Serial Bus
WPS: Wireless Priority Service
3GPP: $3^{rd}$ Generation Partnership Project
5G: 5th Generation
5GC: 5G Core network
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1a, 1b, 2 and 3 to assist in understanding the technology underlying the described examples.

Figure 1A:
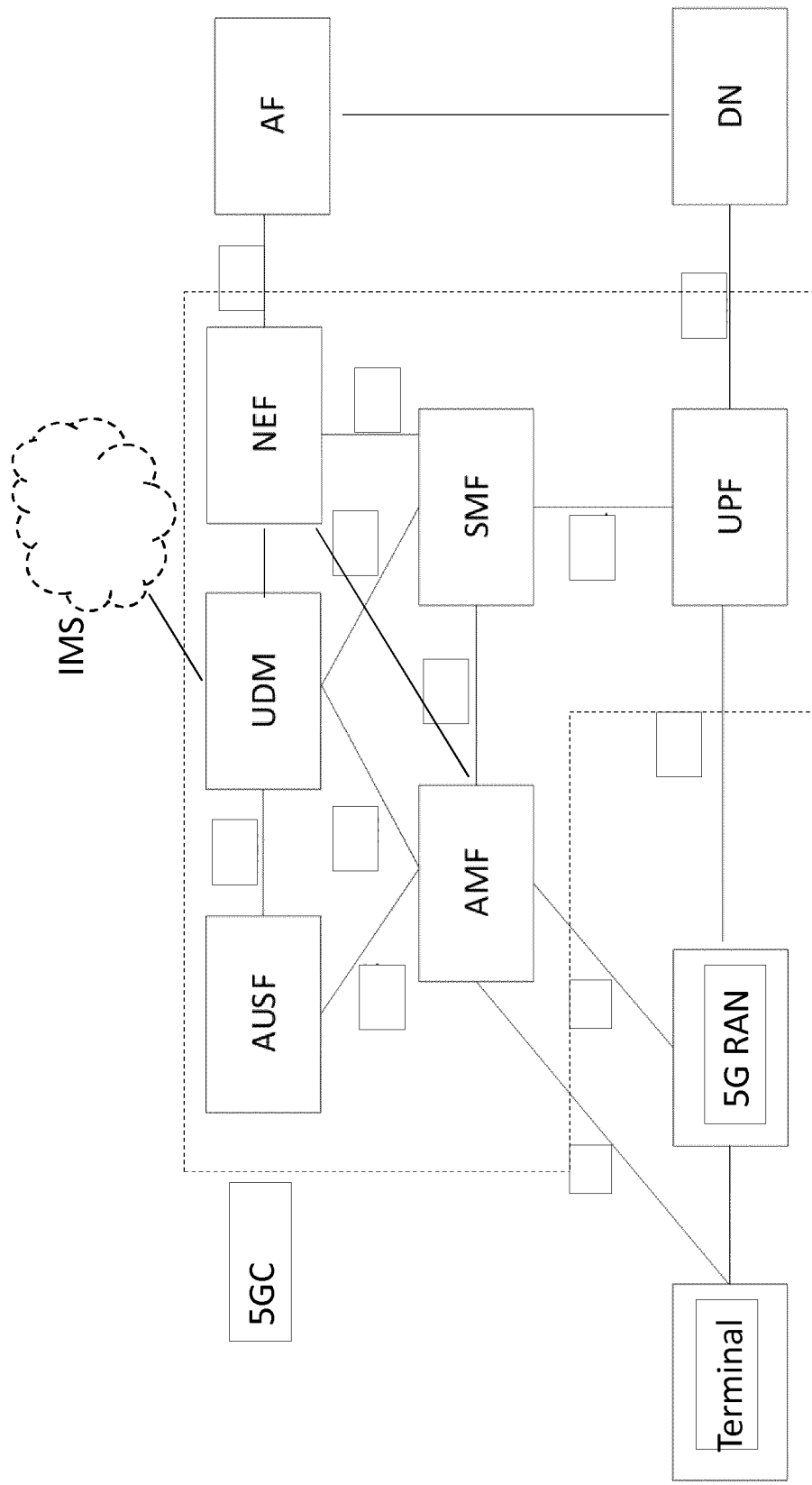
FIG. 1a shows a schematic representation of a 5G system (5GS) comprising an internet protocol multimedia subsystem (IMS)

FIG. 1a shows a schematic representation of a 5G system (5GS). The 5GS may comprises a terminal, a 5G radio access network (5G RAN), a 5G core network (5GC), an internet multimedia subsystem (IMS), one or more application function (AF) and one or more data networks (DN).

The 5G RAN may comprise one or more gNodeB (GNB) distributed unit functions connected to one or more gNodeB (GNB) centralized unit functions.

The 5GC may comprise an access management function (AMF), a session management function (SMF), an authentication server function (AUSF), a user data management (UDM), a user plane function (UPF) and/or a network exposure function (NEF).

Figure 1B:
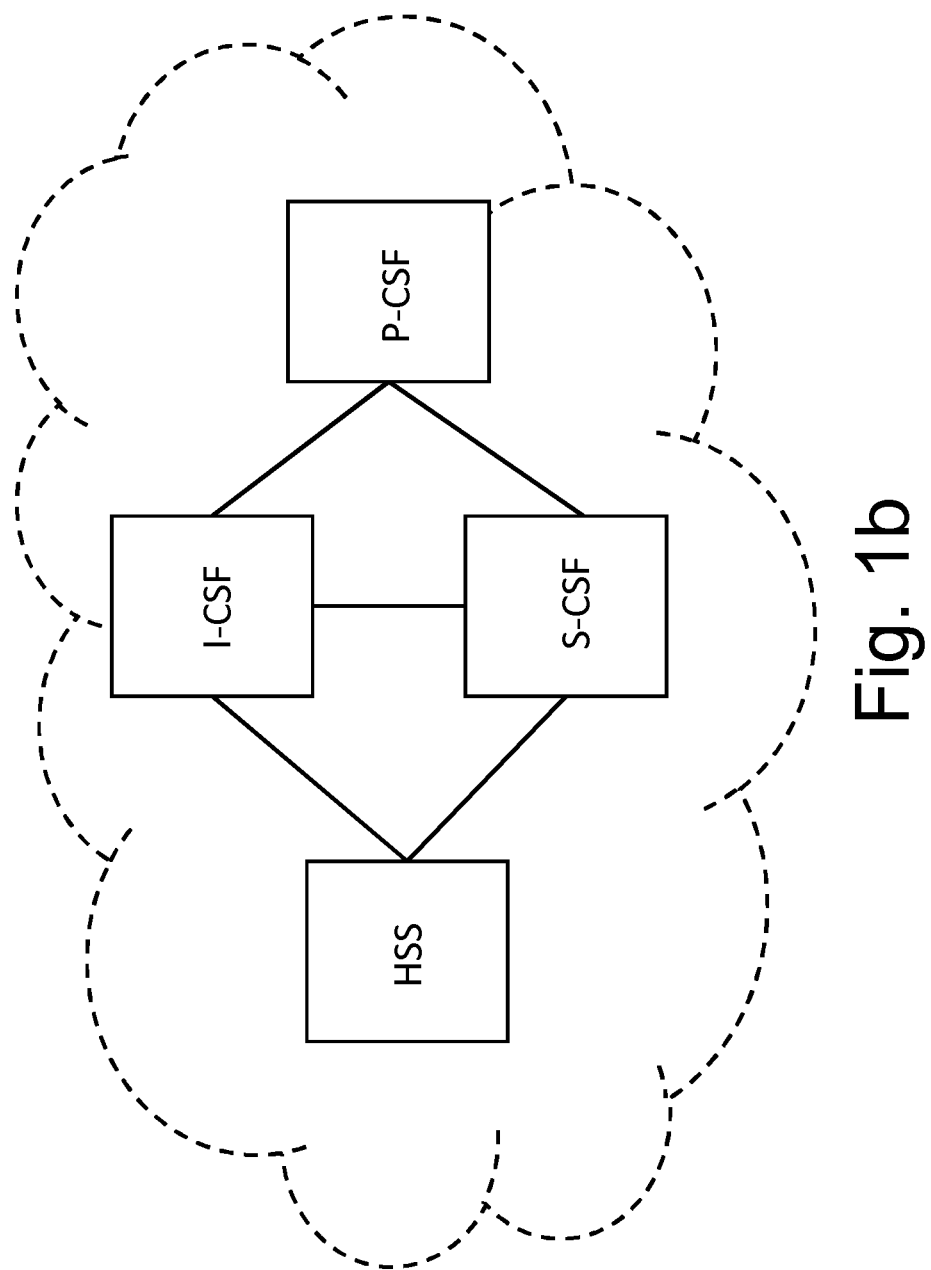
FIG. 1b shows a schematic representation of an IMS.

FIG. 1b shows a schematic representation of an IMS. The IMS may comprise a user plane and a control plane. The control plane may comprise a home subscriber server (HSS), a proxy call session control function (P-CSCF), an interrogating call session control function (I-CSCF) and a serving call session control function (S-CSCF). The P-CSCF, the I-CSCF and the S-CSCF may be implemented in one or more servers.

Figure 2:
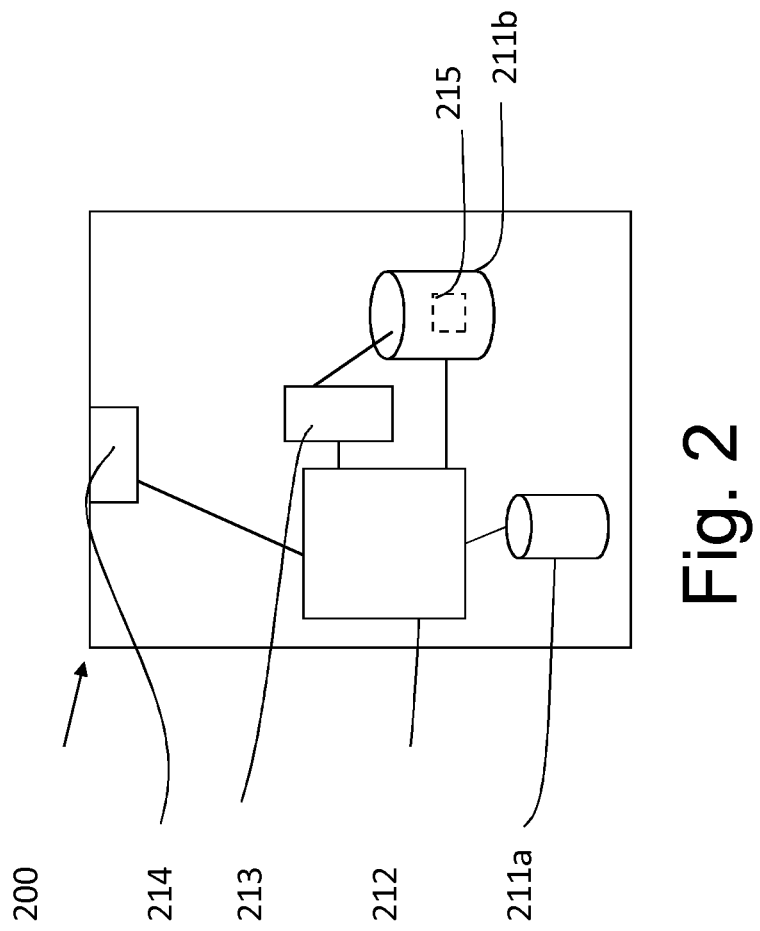
FIG. 2 shows a schematic representation of a control apparatus.

FIG. 2 illustrates an example of a control apparatus 200 for controlling a function or a server of an IMS, such as the HSS, P-CSCF, I-CSCF or S-CSCF as illustrated on FIG. 1b. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function or server of an IMS, such as the HSS, P-CSCF, I-CSCF or S-CSCF. In some embodiments, each function or server of an IMS, such as the HSS, P-CSCF, I-CSCF or S-CSCF comprises a control apparatus 200. In alternative embodiments, two or more functions or server of an IMS, such as the HSS, P-CSCF, I-CSCF or S-CSCF may share a control apparatus.

Figure 3:
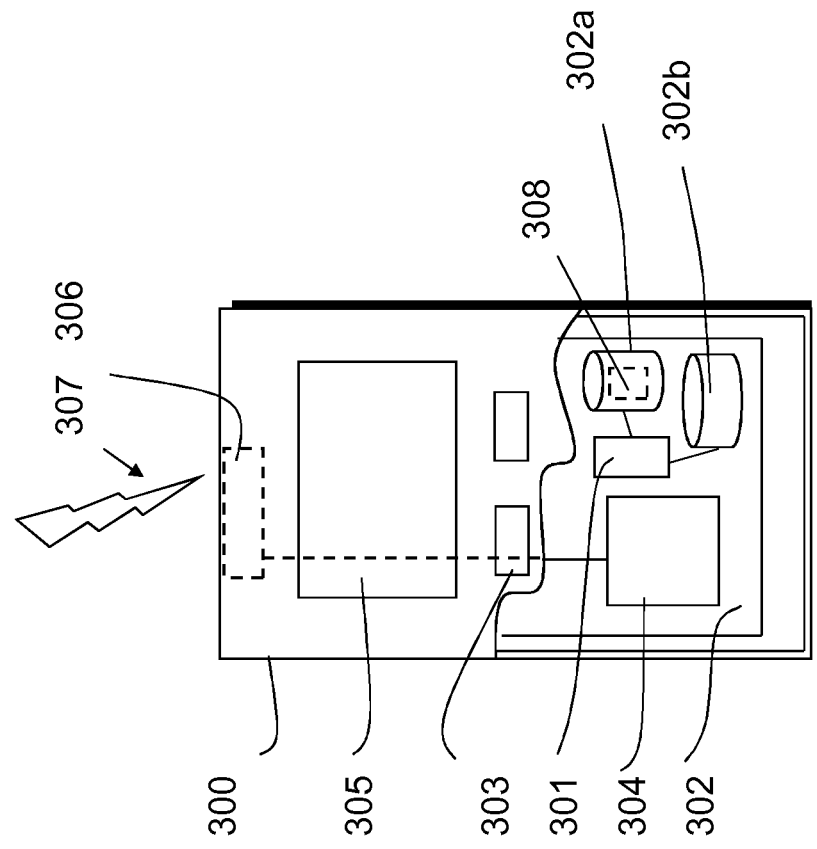
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 211a and the ROM 211b. The at least one processor 301 may be configured to execute an appropriate software code 308. The software code 308 may for example allow to perform one or more of the present aspects. The software code 308 may be stored in the ROM 211b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Although one or more of the preceding and following aspects relate to 5GS and IMS, it will be understood that similar aspects may relate to other systems.

In IMS the HSS may store subscriber information for a user equipment (UE). The subscriber information for the UE may for example comprise an IMS private identity (IMPI), an IMS public identity (IMPU), a service priority, an extended priority or other. The subscriber information for the UE may be originally provided and/or subsequently updated by an operator.

When the subscriber information for the UE is updated at the HSS, the HSS may send the updated subscriber information for the UE to the S-CSCF and the S-CSCF may send the updated subscriber information for the UE to the P-CSCF. The updated subscriber information for the UE may be needed by the S-CSCF and/or the P-CSCF to take subsequent actions (e.g. allowing a call originating from the user and/or terminating at the UE).

More specifically, when the subscriber information for the UE is updated at the HSS, the HSS may send a push profile request (PPR) message to the S-CSCF indicating the updated subscriber information for the user. The S-CSCF may send a NOTIFY message to the P-CSCF indicating the updated subscriber information for the UE.

In the event that the S-CSCF is down and/or is being restarted when the HSS sends the PPR message to the S-CSCF, the S-CSCF may fail to receive the PPR and may fail to send the NOTIFY message to the P-CSCF. As a result, the S-CSCF and the P-CSCF may fail to receive the updated subscriber information for the UE.

As per TS 23.380 a restoration of the S-CSCF may not be triggered by HSS initiated message. However, a restoration of the S-CSCF may be triggered by a call originating from the UE being placed or a call terminating at the UE being placed.

When a call originating from the UE being placed or a call terminating at the UE is placed, a restoration of the S-CSCF may be triggered. As part of the restoration, the HSS may send updated subscriber information for the user to the S-CSCF. However, the S-CSCF may not send the updated subscriber information for the user to the P-CSCF.

More specifically, the S-CSCF may send a server assignment request (SAR) message to the HSS requesting the restoration information. The S-CSCF may receive a server assignment answer (SAA) message from the HSS with the restoration information as well as updated subscriber information for the UE. However, the S-CSCF may not send a NOTIFY message to the P-CSCF with the updated subscriber information for the UE.

As a result, when a subsequent call originating from the UE or terminating at the UE is placed using the updated subscriber information for the UE, the call may be rejected by the P-CSCF because the updated subscriber information for the UE cannot be found in a registration context maintained by the P-CSCF for the UE.

This problem will now be explained in more details in reference to FIGS. 4 and 5.

Figure 4:
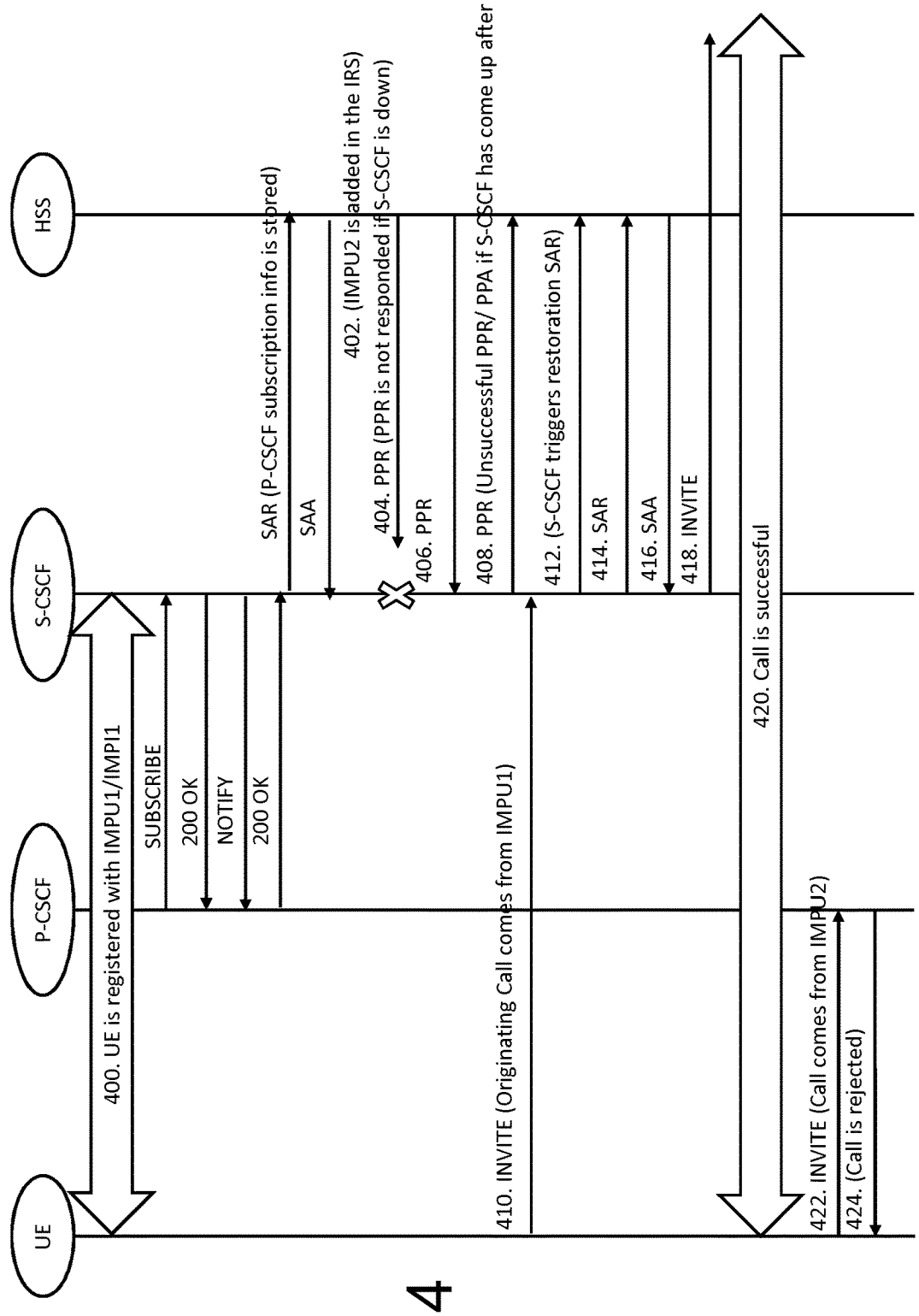
FIG. 4 shows a schematic representation of a method performed in an IMS, wherein a call failure occurs when a serving call session control function (S-CSCF) is restored after adding an IMS public identity (IMPU) in a home subscriber server (HSS) for a user, wherein the restoration of the S-CSCF is triggered by a call originating from the user.

FIG. 4 shows a schematic representation of a method performed in an IMS, wherein a call involving a UE is rejected by the P-CSCF.

In step 400, a customer may be provided with subscriber information for the UE by the operator. The subscriber information for the UE may comprise IMPU1 and IMPI1. The subscriber information for the UE may be provided to the customer by mail, by email or other. The subscriber information for the UE may be stored at the HSS, for example in an implicit registration set (IRS). The subscriber information may be used by the UE for telephony services such as call, call hold, call barring, announcement or other.

In step 400, the UE may register to the P-CSCF and the S-CSCF with the subscriber information for the UE. The UE may send the subscriber information for the UE to the P-CSCF. The P-CSCF may store the subscriber information for the UE in the registration context for the UE. The P-CSCF may send the subscriber information for the UE to the S-CSCF.

The UE may send a SUBSCRIBE message to the P-CSCF to subscribe for a registration (or "reg") event for the UE (not illustrated). Similarly, the P-CSCF may send a SUBSCRIBE message to the S-CSCF to subscribe for a registration (or "reg") event for the UE. The S-CSCF may send a 200 OK message to indicate acknowledgement. The S-CSCF may send a NOTIFY message to indicate that a state is active. The P-CSCF may send a 200 OK to indicate acknowledgement. TS 24 24.229 section 5.2.3 provides more details about how the P-CSCF may send a SUBSCRIBE message to the S-CSCF to subscribe for a registration (or "reg") event for the UE.

In step 402 the customer may request updated subscriber information for the UE to the operator. The customer may be provided with the updated subscriber information for the UE by the operator. The updated subscriber information may comprise IMPU2. The updated subscriber information for the UE may be provided to the customer by mail, by email or other. The updated subscriber information for the UE may be stored separately or with the subscriber information at the HSS in the IRS. The updated subscriber information may be used by the UE for a different service than the subscriber information. The updated subscriber information may be used for rich communication services (RCS) such as group chat, voice messaging, video messaging or other.

In step 404, the HSS may send a PPR to the S-CSCF indicating the updated subscriber information for the UE. The HSS may send the PPR to the S-CSCF in response to the updated subscriber information for the UE being stored in the HSS by the operator. The S-CSCF may be down and may not receive the PPR. The S-CSCF may therefore not receive the updated subscriber information for the UE.

Alternatively or additionally, in step 406, the HSS may send a PPR to the S-CSCF indicating the updated subscriber information for the UE. The S-CSCF may receive the PPR whilst the S-CSCF is being restarted. The S-CSCF may therefore not receive the updated subscriber information for the UE.

In step 408, the S-CSCF may send an unsuccessful PPA to the HSS.

In step 410, the S-CSCF may receive an INVITE message from the UE for a call originating from the UE (i.e. the caller). The call originating from the UE may be a telephony service call.

In step 412, the restoration of the S-CSCF is triggered.

In step 414, the S-CSCF may send a SAR message to the HSS requesting restoration information In step 416, the S-CSCF may receive a SAA message from the HSS with the restoration information as well as the updated subscriber information for the user.

In step 418, the S-CSCF may send an INVITE message to another UE (i.e. the callee).

In step 420, the call between the UE (i.e. the caller) and the other UE (i.e. the caller) may be successful.

In step 422, the P-CSCF may receive an INVITE message from the UE for a subsequent call originating from the user (i.e. the caller). The INVITE message may refer to the UE with the updated subscriber information for the UE. The call originating from the UE may be a rich communication service call.

In step 424, the P-CSCF may not recognize the updated subscriber information for the UE because the updated subscriber information for the UE has not been sent by the S-CSCF to the P-CSCF and the P-CSCF may not have stored the updated subscriber information for the UE in the registration context for the UE. The P-CSCF may reject the call and may indicate that the UE (i.e. the caller) is not registered.

Figure 5:
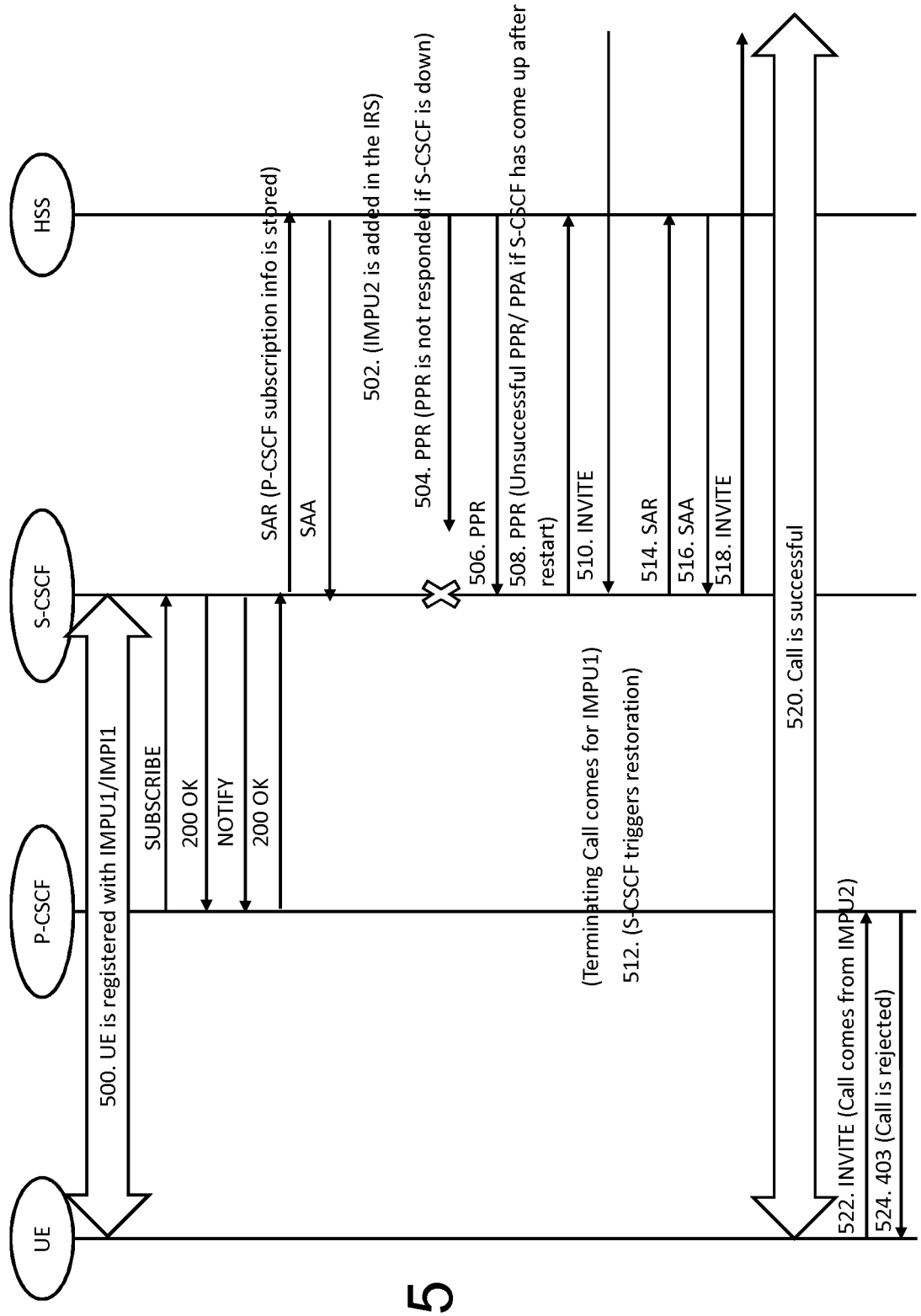
FIG. 5 shows a schematic representation of a method performed in an IMS, wherein a call failure occurs when a S-CSCF is restored after adding an IMPU in a HSS for a user, wherein the restoration of the S-CSCF is triggered by a call terminating at the user.

FIG. 5 shows a schematic representation of another method performed in an IMS, wherein a call involving a UE is rejected by the P-CSCF.

In step 500, a customer may be provided with subscriber information for a UE by the operator. The subscriber information for the UE may comprise IMPU1 and IMPI1. The subscriber information for the UE may be provided to the customer by mail, by email or other. The subscriber information for the UE may be stored at the HSS, for example in an IRS. The subscriber information for the UE may be used by the user for telephony services such as call, call hold, call barring, announcement or other.

In step 500, the UE may register to the P-CSCF and the S-CSCF with the subscriber information for the UE. The UE may send the subscriber information for the UE to the P-CSCF. The P-CSCF may store the subscriber information for the UE in the registration context for the UE. The P-CSCF may send the subscriber information for the UE to the S-CSCF.

The UE may send a SUBSCRIBE message to the P-CSCF to subscribe for a registration (or "reg") event for the UE (not illustrated). Similarly, the P-CSCF may send a SUBSCRIBE message to the S-CSCF to subscribe for a registration (or "reg") event for the UE. The S-CSCF may send a 200 OK message to indicate acknowledgement. The S-CSCF may send a NOTIFY message to indicate that a state is active. The P-CSCF may send a 200 OK to indicate acknowledgement. TS 24 24.229 section 5.2.3 provides more details about how the P-CSCF may send a SUBSCRIBE message to the S-CSCF to subscribe for a registration (or "reg") event for the UE.

In step 502 the customer may request updated subscriber information for the UE to the operator. The customer may be provided with the updated subscriber information for the UE by the operator. The updated subscriber information may comprise IMPU2. The updated subscriber information for the UE may be provided to the customer by mail, by email or other. The updated subscriber information for the UE may be stored separately or with the subscriber information at the HSS in the IRS. The updated subscriber information may be used by the UE for a different service than the subscriber information. The updated subscriber information may be used for RCS such as group chat, voice messaging, video messaging or other.

In step 504, the HSS may send a PPR to the S-CSCF indicating the updated subscriber information for the UE. The HSS may send the PPR to the S-CSCF in response to the updated subscriber information for the UE being stored in the HSS by the operator. The S-CSCF may be down and/or may fail to receive the PPR. The S-CSCF may therefore not receive the updated subscriber information for the UE.

Alternatively or additionally, in step 506, the HSS may send a PPR to the S-CSCF indicating the updated subscriber information for the UE. The S-CSCF may receive the PPR whilst the S-CSCF is being restarted. The S-CSCF may therefore not receive the updated subscriber information for the UE.

In step 508, the S-CSCF may send an unsuccessful PPA to the HSS.

In step 510, the S-CSCF may receive an INVITE message from another UE (i.e. the caller) for a call terminating at the UE (i.e. the callee). The INVITE message may refer to the UE with the subscriber information for the UE. The call originating from the UE may be a telephony service call.

In step 512, the restoration of the S-CSCF is triggered.

In step 514, the S-CSCF may send a SAR message to the HSS requesting restoration information.

In step 516, the S-CSCF may receive a SAA message from the HSS with the restored information as well as the updated subscriber information for the UE.

In step 518, the S-CSCF may send an INVITE message to the other UE (i.e. the caller).

In step 520, the call between the UE (i.e. the callee) and the other UE (i.e. the caller) may be successful.

In step 522, the P-CSCF may receive an INVITE message from the UE for a subsequent call originating from the UE (i.e. the caller). The call originating from the UE may be a rich communication service call.

In step 524, the P-CSCF may not recognize the updated subscriber information for the UE because the updated subscriber information for the UE has not been sent by the S-CSCF to the P-CSCF and has not been stored in the registration context of the UE. The P-CSCF may reject the call and may indicate that the UE is not registered.

In summary, any use case where the P-CSCF may need the updated subscription information for the UE may not work. It may lead to various problems including call failure.

For example, if an IMPU is updated (e.g. added or removed) for a UE, then this IMPU is not received by the P-CSCF. Hence any calls referring to this new IMPU may be rejected by the P-CSCF telling the UE is not registered.

Likewise, if a priority (e.g. service priority or extended priority) is updated (e.g. added or removed) for a UE, then this priority may not be received by the P-CSCF. Hence any priority call from or to the UE may be rejected when the P-CSCF is in overload condition. Even if the P-CSCF is not in overload condition the call may be processed like a normal call which may be dropped by another other network node.

One or more of the following aspects address the above problems by providing the updated information for the UE to the P-CSCF after the S-CSCF is down and/or restarted. Typically, the P-CSCF subscribes with the S-CSCF for a registration (or "reg") event for the UE and may store subscription information for the P-CSCF in the HSS like the HSS does for the updated subscription information for the UE. After the S-CSCF is down and/or restarted, when an originating or terminating call is placed and the S-CSCF restoration is triggered, the HSS may send restoration information for the UE along with updated subscription information for the UE to the S-CSCF. The HSS may also send subscription information for the P-CSCF as well to the S-CSCF to allow the S-CSCF to identify the P-CSCF. The S-CSCF may send a NOTIFY message to the P-CSCF with the updated subscription information for the UE, for example in an xml body. In this way, the P-CSCF may receive the updated subscription information and the above problems may be addressed.

Figure 6:
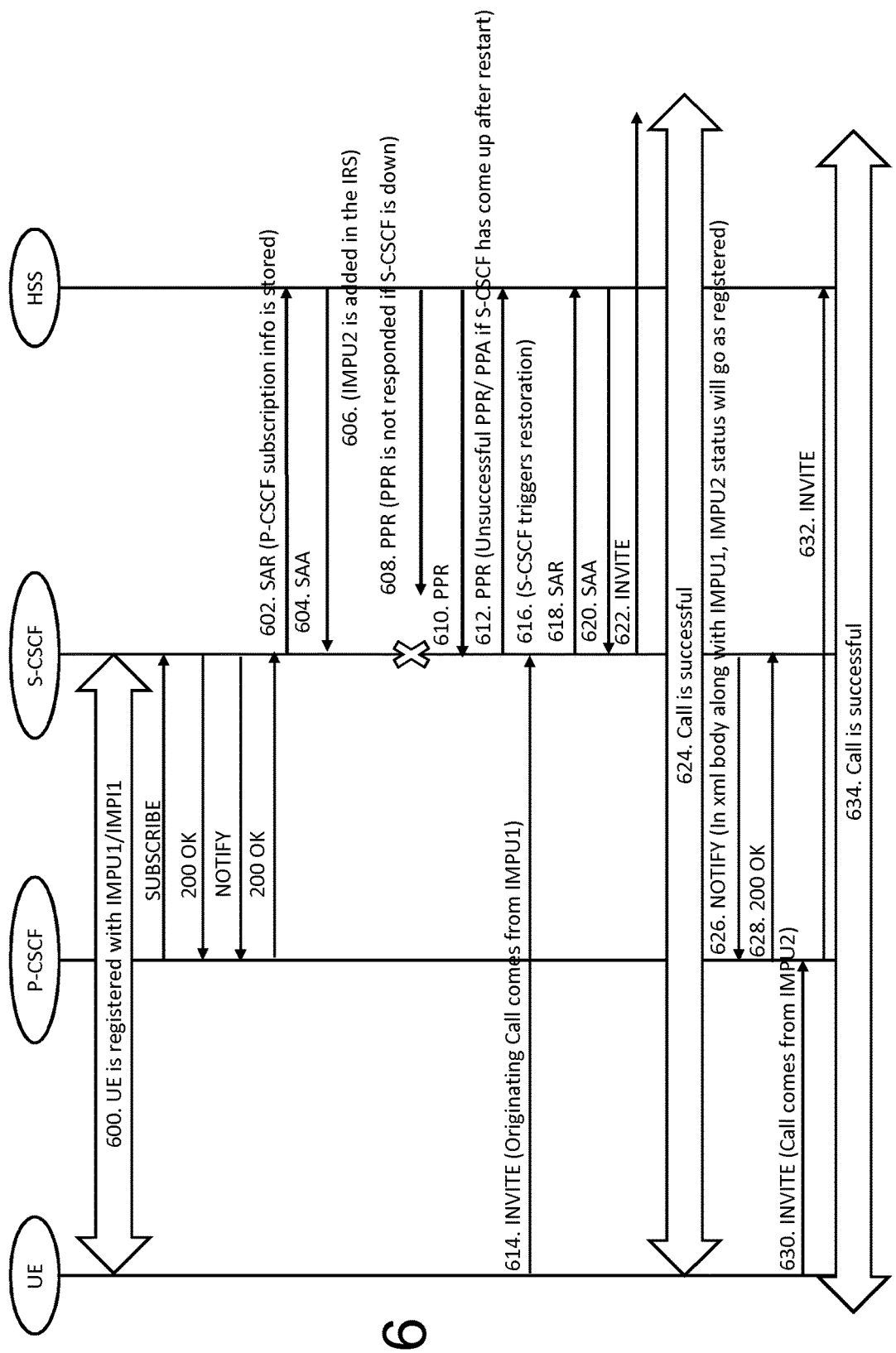
FIG. 6 shows a schematic representation of a method performed in an IMS, wherein a call is successful when a S-CSCF is restored after adding an IMPU in a HSS for a user, wherein the restoration of the S-CSCF is triggered by a call originating from the user.

FIG. 6 shows a schematic representation of a method performed in an IMS, wherein a call involving a UE is successful despite referring to updated subscription information for the user.

In step 600, a customer may be provided with subscriber information for the UE by the operator. The subscriber information for the UE may comprise IMPU1 and IMPI1. The subscriber information for the UE may be provided to the customer by mail, by email or other. The subscriber information for the UE r may be stored at the HSS, for example in an IRS. The subscriber information may be used by the UE for telephony services such as call, call hold, call barring, announcement or other.

In step 600, the UE may register to the P-CSCF and the S-CSCF with the subscriber information for the UE. The UE may send the subscriber information for the UE to the P-CSCF. The P-CSCF may store the subscriber information for the UE in the registration context for the UE. The P-CSCF may send the subscriber information for the UE to the S-CSCF. The P-CSCF may also send subscriber information for the P-CSCF to the S-CSCF.

The UE may send a SUBSCRIBE message to the P-CSCF to subscribe for a registration (or "reg") event for the UE. Similarly, the P-CSCF may send a SUBSCRIBE message to the S-CSCF to subscribe for a registration (or "reg") event for the UE. The S-CSCF may send a 200 OK message to indicate acknowledgement. The S-CSCF may send a NOTIFY message to indicate that a state is active. The P-CSCF may send a 200 OK to indicate acknowledgement. TS 24 24.229 section 5.2.3 provides more details about how the P-CSCF may send a SUBSCRIBE message to the S-CSCF to subscribe for a registration (or "reg") event for the UE.

By sending the SUBSCRIBE message to the S-CSCF, the P-CSCF may indicate to the S-CSCF that whenever the S-CSCF receives updated subscriber information for the UE from the HSS (in particular in response to the S-CSCF being restored), the S-CSCF should send a NOTIFY message to the P-CSCF with the updated subscriber information for the user.

In step 602 the S-CSCF may send SAR message to the HSS with the subscriber information for the P-CSCF. The subscriber information for the P-CSCF may take the form of an AVP and may be designated "PCSCF-Subscription-Info". A possible format may be as follows:

```
PCSCF-Subscription-Info ::= < AVP Header: XXX, 10415>
    { Call-ID-SIP-Header }
    { From-SIP-Header }
    { To-SIP-Header }
    {Contact}
    *[AVP ]
```

In step 604 the HSS may send a SAA to the S-CSCF to indicate that the subscriber information for the P-CSCF has been stored in the HSS.

In step 606 the customer may request updated subscriber information for the UE to the operator. The customer may be provided with the updated subscriber information by the operator. The updated subscriber information may comprise IMPU2. The updated subscriber information for the UE may be provided to the customer by mail, by email or other. The updated subscriber information for the UE may be stored separately or with the subscriber information at the HSS, for example in the IRS. The updated subscriber information may be used by the UE for a different service than the subscriber information. The updated subscriber information may be used for rich communication services (RCS) such as group chat, voice messaging, video messaging or other.

In step 608, the HSS may send a PPR to the S-CSCF indicating the updated subscriber information for the UE. The HSS may send the PPR to the S-CSCF in response to the updated subscriber information for the UE being stored in the HSS by the operator. The S-CSCF may be down and/or may fail to receive the PPR. The S-CSCF may therefore fail to receive the updated subscriber information for the user.

Alternatively or additionally, in step 610, the HSS may send a PPR to the S-CSCF indicating the updated subscriber information for the UE. The S-CSCF may receive the PPR whilst the S-CSCF is being restarted. The S-CSCF may therefore fail to receive the updated subscriber information for the UE.

In step 612, the S-CSCF may send an unsuccessful PPA to the HSS.

In step 614, the S-CSCF may receive an INVITE message from the UE for a call originating from the UE (i.e. the caller). The call originating from the UE may be a telephony service call.

In step 616, the restoration of the S-CSCF is triggered.

In step 618, the S-CSCF may send a SAR message to the HSS requesting restoration information.

In step 620, the S-CSCF may receive a SAA message from the HSS with the restoration information as well as the subscriber information for the UE, the updated subscriber information for the UE and/or the subscriber information for the P-CSCF.

In step 622, the S-CSCF may send an INVITE message to another UE (i.e. the callee).

In step 624, the call between the UE (i.e. the caller) and the other UE (i.e. the caller) may be successful.

In step 626, the S-CSCF may send a NOTIFY message to the P-CSCF to indicate the subscriber information for the UE and/or the updated subscriber information for the UE. The P-CSCF may store the subscriber information for the UE and/or the updated subscriber information for the UE in the registration context of the UE.

In step 628, the P-CSCF may send a 200 OK message to indicate acknowledgement.

In step 630, the P-CSCF may receive an INVITE message from the UE for a subsequent call originating from the UE (i.e. the caller). The INVITE message may refer to the UE with the updated subscriber information for the UE. The P-CSCF may recognize the updated subscription information for the UE which is stored at the P-CSCF in the registration context of the UE. The call originating from the UE may be a rich communication service call.

In step 632, the P-CSCF may send an INVITE message to another UE (i.e. the callee).

In step 634, the call may be successful.

Figure 7:
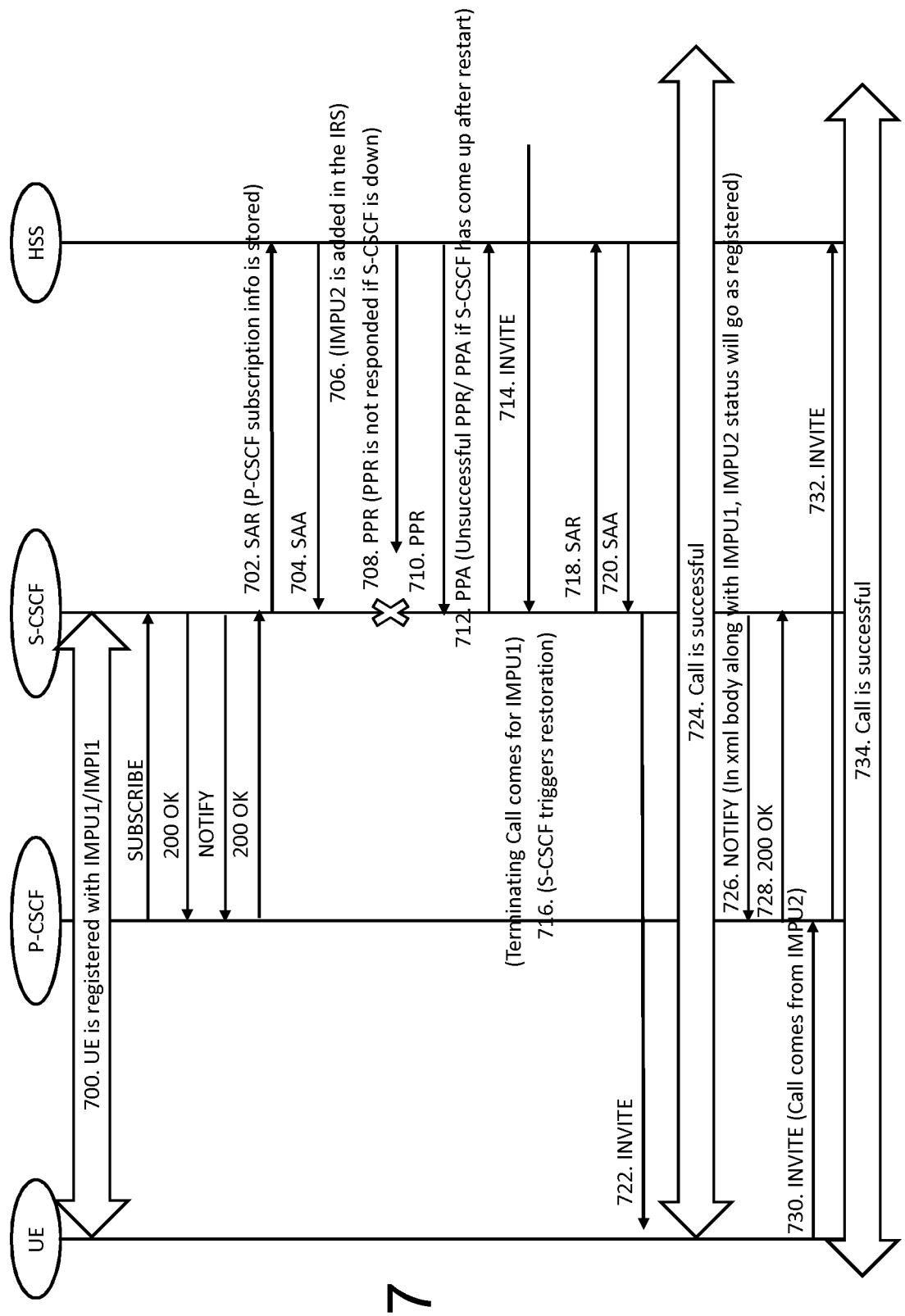
FIG. 7 shows a schematic representation of a method performed in an IMS, wherein a call is successful when a S-CSCF is restored after adding an IMPU in a HSS for a user, wherein the restoration of the S-CSCF is triggered by a call terminating at the user.

FIG. 7 shows a schematic representation of a method performed in an IMS, wherein a call involving a UE is successful despite referring to updated subscription information for the user.

In step 700, a customer may be provided with subscriber information for the UE by the operator. The subscriber information for the UE may comprise IMPU1 and IMPI1. The subscriber information for the UE may be provided to the customer by mail, by email or other. The subscriber information for the UE may be stored at the HSS, for example in an IRS. The subscriber information may be used by the UE for telephony services such as call, call hold, call barring, announcement or other.

In step 700, the UE may register to the P-CSCF and the S-CSCF with the subscriber information for the UE. The user may send the subscriber information for the UE to the P-CSCF. The P-CSCF may store the subscriber information for the user in a registration context. The P-CSCF may send the subscriber information for the user to the S-CSCF. The P-CSCF may also send subscriber information for the P-CSCF to the S-CSCF.

The UE may send a SUBSCRIBE message to the P-CSCF to subscribe for a registration (or "reg") event for the UE (not illustrated). Similarly, the P-CSCF may send a SUBSCRIBE message to the S-CSCF to subscribe for a registration (or "reg") event for the user. The S-CSCF may send a 200 OK message to indicate acknowledgement. The S-CSCF may send a NOTIFY message to indicate that a state is active. The P-CSCF may send a 200 OK to indicate acknowledgement.

By sending the SUBSCRIBE message to the S-CSCF, the P-CSCF may indicate to the S-CSCF that whenever the S-CSCF receives updated subscriber information for the UE from the HSS (in particular in response to the S-CSCF being restored), the S-CSCF should send a NOTIFY message to the P-CSCF with the updated subscriber information for the UE.

In step 702 the S-CSCF may send SAR message to the HSS with the subscriber information for the P-CSCF. The subscriber information for the P-CSCF may take the form of an AVP and may be designated "PCSCF-Subscription-Info". A possible format may be as follows:

```
PCSCF-Subscription-Info ::= < AVP Header: XXX, 10415>
    { Call-ID-SIP-Header }
    { From-SIP-Header }
    { To-SIP-Header }
    {Contact}
    *[AVP ]
```

In step 704 the HSS may send a SAA to the S-CSCF to indicate that the subscriber information for the P-CSCF has been stored in the HSS.

In step 706 the customer may request updated subscriber information for the UE to the operator. The customer may be provided with the updated subscriber information by the operator. The updated subscriber information may comprise IMPU2. The updated subscriber information for the UE may be provided to the customer by mail, by email or other. The updated subscriber information for the UE may be stored separately or with the subscriber information at the HSS in the IRS. The updated subscriber information may be used by the UE for a different service than the subscriber information. The updated subscriber information may be used for rich communication services (RCS) such as group chat, voice messaging, video messaging or other.

In step 708, the HSS may send a PPR to the S-CSCF indicating the updated subscriber information for the UE. The HSS may send the PPR to the S-CSCF in response to the updated subscriber information for the UE being stored in the HSS by the operator. The S-CSCF may be down and may fail to receive the PPR. The S-CSCF may therefore fail to receive the updated subscriber information for the UE.

Alternatively or additionally, in step 710, the HSS may send a PPR to the S-CSCF indicating the updated subscriber information for the UE. The S-CSCF may receive the PPR whilst the S-CSCF is being restarted. The S-CSCF may therefore fail to receive the updated subscriber information for the UE.

In step 712, the S-CSCF may send an unsuccessful PPA to the HSS.

In step 714, the S-CSCF may receive an INVITE message from another UE (i.e. the caller) for a call terminating at the UE (i.e. the callee). The call terminating the user may be a telephony service call.

In step 716, the restoration of the S-CSCF is triggered.

In step 718, the S-CSCF may send a SAR message to the HSS requesting restoration information.

In step 720, the S-CSCF may receive a SAA message from the HSS with the restoration information as well as subscriber information for the user, the updated subscriber information for the user and/or the subscriber information for the P-CSCF.

In step 722, the S-CSCF may send an INVITE message to the UE (i.e. the callee).

In step 724, the call between the UE (i.e. the caller) and the other UE (i.e. the caller) may be successful.

In step 726, the S-CSCF may send a NOTIFY message to the P-CSCF to indicate the updated subscriber information for the UE. The P-CSCF may store the updated subscriber information for the UE in the registration context of the UE.

In step 728, the P-CSCF may send a 200 OK message to indicate acknowledgement.

In step 730, the P-CSCF may receive an INVITE message from the UE for a subsequent call originating from the UE (i.e. the caller). The INVITE message may refer to the UE with the updated subscriber information for the UE. The P-CSCF may recognize the updated subscription information for the UE which is stored at the P-CSCF in the registration context of the UE. The call originating from the UE may be a rich communication service call.

In step 732, the P-CSCF may send an INVITE message to another UE r (i.e. the callee).

In step 734, the call may be successful.

It will be understood that subsequently the HSS may also send a registration termination request (RTR) to the S-CSCF to indicate that the UE is deregistered. The S-CSCF may send registration termination answer (RTA) to indicate acknowledgment. The S-CSCF may send a NOTIFY message to the P-CSCF to indicate that the state is rejected. The P-CSCF may send a 200 OK message to the S-CSCF to indicate acknowledgement. The P-CSCF may remove the registration context of the UE which it had previously stored. As a result, if a call involving the UE is placed (a call originating from the UE or terminating at the UE) the call may be rejected because the UE is not registered.

It will be understood that although in FIGS. 4 to 7 the updated subscription information for the UE relates to an IMPU it will be understood that the updated subscription information for the UE may additionally or alternatively comprise an IMPI, a service priority or an extended priority.

Both service priority and extended priority may work similarly. When subscription information for the UE is provided by the operator to the HSS, the service priority may not be configured. Hence any call may be treated as a normal call. When the operator adds service priority for the UE (e.g. for IMPU1 or IMPU2) in the HSS, a call originating from the UE or terminating at the UE may be treated as a priority call.

For example, the service priority level may take a value (e.g. 0, 1, 2, 3, 4). One of these values may be configured in the HSS for the UE (e.g. for IMPU1 or IMPU2). In the S-CSCF namespace like emergency telecommunication service (ets) or wireless priority service (wps) may be configured. Resource priority header (RPH) for the UE may be ets.0 or wps.1 etc. These namespaces may be standardized. Only one or more types of priorities may be assigned to the UE Similarly, when subscription information for the UE was provided by the operator to the HSS, extended priority may not be configured. When the operator adds extended priority for the UE (e.g. for IMPU1 or IMPU2) in the HSS, any call originating from the UE or terminating at the UE may be treated as an extended priority call.

Extended Priority was brought in the standard so that a UE may have multiple priorities. Namespace and priority level may be configured for user. For example, a namespace may be mission critical push to talk (mcptt) and a priority level may be 1. The S-CSCF may receive both from the HSS. In the below example the resource priority header (RPH) for the UE may be mcptt.1

ExtendedPriority-1
   Namespace-mcptt
   PriorityLevel-1

In summary, as per TS 24.229 section 5.2.3 the P-CSCF initiated subscription for "reg" event may be successful. A "PCSCFSubscription-Info" AVP may be introduced. The S-CSCF may use this AVP to store subscription information for the P-CSCF. The S-CSCF may be down and/or may be restarted whilst subscription information for the UE may be updated at the HSS by the operator. The updated subscription information for the UE may not be received by the S-CSCF. A call originating from the user or terminating at the UE may be placed and the S-CSCF may trigger restoration as per TS 23.380. As part of restoration the S-CSCF may receive the updated subscription information for the UE along with the subscription information for the P-CSCF. After processing the call the S-CSCF may send a NOTIFY message with the updated subscription information for the UE in an xml body. Then use cases like allowing call from new IMPU (which was added) or rejecting call from removed IMPU (one IMPU was removed from IRS) or handling priority call (service priority is added or updated or removed) may work successfully.

Figure 8:
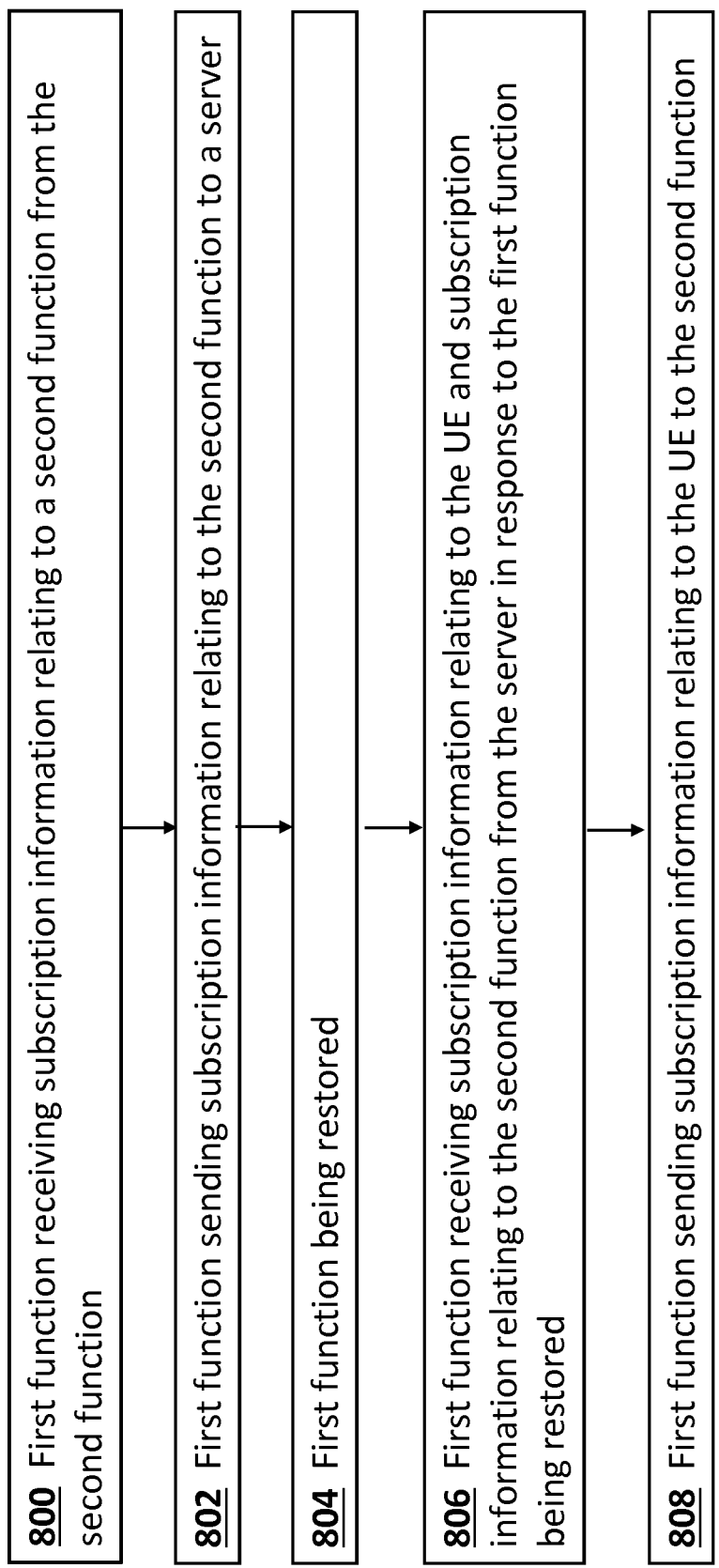
FIG. 8 shows a schematic diagram of a method performed in an IMS by a first function, for example by a S-CSCF.

FIG. 8 shows a schematic diagram of a method performed in an IMS by a first function (e.g. S-CSCF).

In step 800, the first function (e.g. S-CSCF) may receive subscription information relating to a second function (e.g. P-CSCF) from the second function (e.g. P-CSCF). Step 800 of FIG. 8 may be mapped to step 600 of FIG. 6 or step 700 of FIG. 7.

In step 802, the first function (e.g. S-CSCF) may send subscription information relating to the second function (e.g. P-CSCF) to a server (e.g. HSS). Step 802 of FIG. 8 may be mapped to step 602 of FIG. 6 or step 702 of FIG. 7.

In step 804, the first function (e.g. S-CSCF) may be restored. The restoration of the first function (e.g. S-CSCF) may be triggered by a call originating from a UE or terminating at a UE. Step 804 of FIG. 8 may be mapped to step 616 of FIG. 6 or step 716 of FIG. 7.

In step 806, the first function (e.g. S-CSCF) may receive subscription information relating to the UE and subscription information relating to the second function (e.g. P-CSCF) from the server (e.g. HSS) in response to the first function (e.g. S-CSCF) being restored. The subscription information relating to the UE may comprise a user identity (e.g. IMPU), a service priority, an extended priority or other. Step 804 of FIG. 8 may be mapped to step 616 of FIG. 6 or step 716 of FIG. 7.

In step 808, the first function (e.g. S-CSCF) may send subscription information relating to the second function (e.g. P-CSCF). Step 804 of FIG. 8 may be mapped to step 626 of FIG. 6 or step 726 of FIG. 7.

Figure 9:
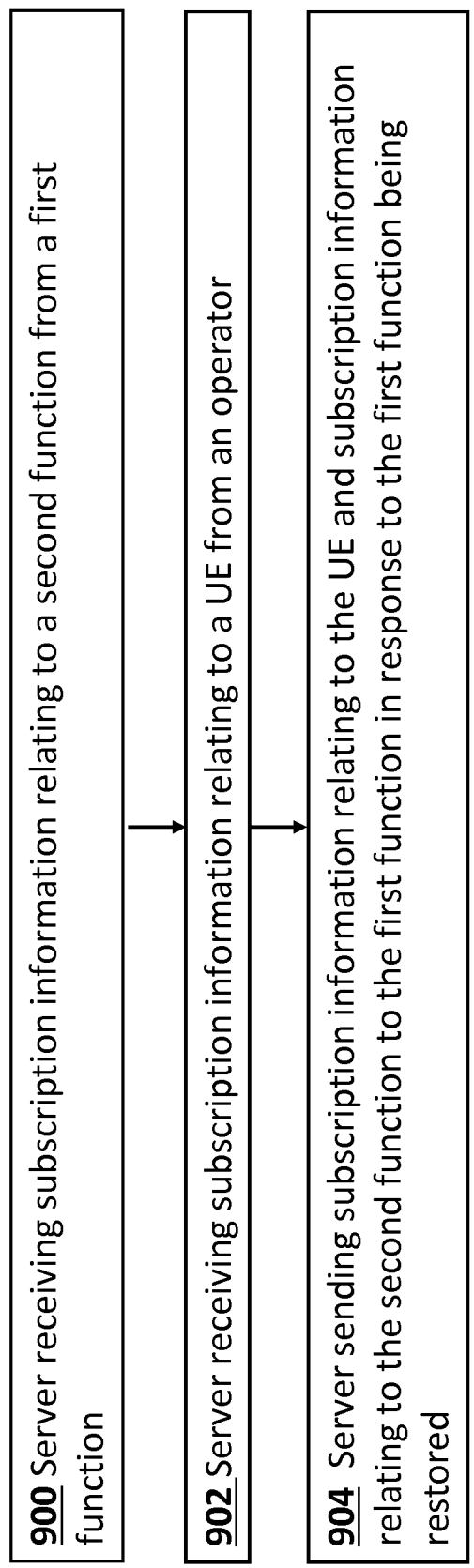
FIG. 9 shows a schematic diagram of a method performed in an IMS by a server, for example by a HSS.

FIG. 9 shows a schematic diagram of a method performed in an IMS by a server (e.g. HSS).

In step 900, the server (e.g. HSS) may receive subscription information relating to a second function (e.g. P-CSCF) from a first function (e.g. S-CSCF). Step 900 of FIG. 9 may be mapped to step 602 of FIG. 6 and step 702 of FIG. 7.

In step 902, the server (e.g. HSS) may receive subscription information relating to a UE from an operator. The subscription information relating to the UE may comprise a user identity (e.g. IMPU), a service priority, an extended priority or other. Step 900 of FIG. 9 may be mapped to step 606 of FIG. 6 and step 706 of FIG. 7.

In step 904, the server (e.g. HSS) may send subscription information relating to the UE and subscription information relating to the second function (e.g. P-CSCF) to the first function (S-CSCF) in response to the first function (S-CSCF) being restored. The restoration of the first function (e.g. S-CSCF) may be triggered by a call originating from the UE or terminating at the UE. Step 900 of FIG. 9 may be mapped to step 620 of FIG. 6 and step 720 of FIG. 7.

Figure 10:
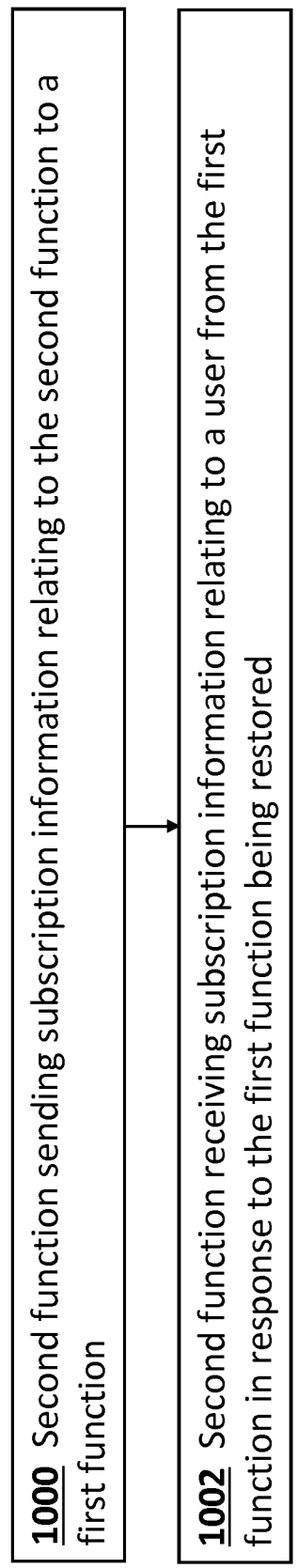
FIG. 10 shows a schematic diagram of a method performed in an IMS by a second function, for example by a P-CSCF.

FIG. 10 shows a schematic diagram of a method performed in an IMS by a second function (e.g. P-CSCF).

In step 1000, the second function (e.g. P-CSCF) may send subscription information relating to the second function (e.g. P-CSCF) to a first function (e.g. S-CSCF).

In step 1002, the second function (e.g. P-CSCF) receives subscription information relating to a UE from the first function (e.g. S-CSCF) in response to the first function (e.g. S-CSCF) being restored. The restoration of the first function (e.g. S-CSCF) may be triggered by a call originating from the UE or terminating at the UE. The subscription information relating to the UE may comprise a user identity (e.g. IMPU), a service priority, an extended priority or other.

Figure 11:
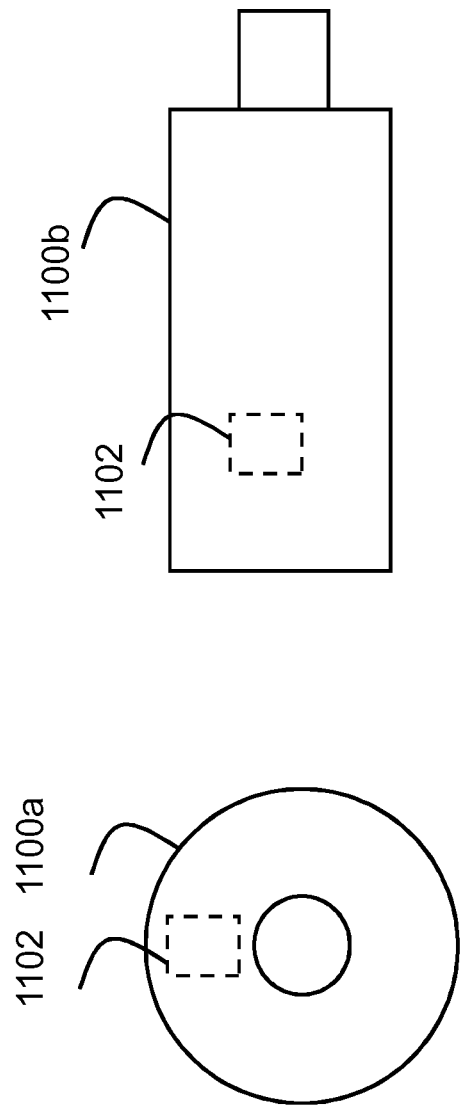
FIG. 11 shows a schematic representation of a non-volatile memory medium storing instructions which when executed by a processor allow a processor to perform one or more of the steps of the method of any of FIGS. 4 to 10.

FIG. 11 shows a schematic representation of non-volatile memory media 1100a (e.g. computer disc (CD) or digital versatile disc (DVD)) and 1100b (e.g. universal serial bus (USB) memory stick) storing instructions and/or parameters 1102 which when executed by a processor allow the processor to perform one or more of the steps of the methods of FIGS. 4 to 10.

It is noted that while the above describes example embodiments, there are several variations and modifications which may be made to the disclosed solution without departing from the scope of the present invention.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 4 to 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
 (a) hardware-only circuit implementations (such as implementations in only analogue and/or digital circuitry);
 (b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
 at least one processor; and
 at least one memory including computer program code of a first function,
 wherein the computer program code, when executed by the at least one processor, causes the first function at least to perform:
 receiving, prior to the first function being restored, subscription information relating to a second function from the second function;
 sending, prior to the first function being restored, the subscription information relating to the second function to a server;
 restoring the first function, wherein restoring the first function comprises receiving the subscription information relating to the second function and updated subscriber information relating to a user equipment from the server; and
 after the first function is restored, sending the updated subscriber information relating to the user equipment to the second function based on the subscription information relating to the second function.

2. The apparatus of claim 1, wherein the first function comprises a serving call session control function, the server comprises a home subscription server, and the second function comprises a proxy call session control function.

3. The apparatus of claim 1, wherein the restoring of the first function is triggered by a call terminating at or originating from the user equipment.

4. The apparatus of claim 1, wherein the updated subscriber information relating to the user equipment comprises at least one of a user equipment identity, a service priority and an extended priority.

5. The apparatus of claim 1, wherein when the computer program code is executed by the at least one processor, the first function is further caused to perform:
 sending the updated subscriber information relating to the user equipment to the second function along with previous subscriber information relating to the user equipment.

6. The apparatus of claim 5, wherein the updated subscriber information relating to the user equipment is sent to the second function along with the previous subscriber information relating to the user equipment in a notify message.

7. The apparatus of claim 1, wherein the computer program code, when executed by the at least one processor, causes the first function at least to perform:
 restarting the first function after sending the subscription information relating to the second function to the server and prior to the first function being restored.

8. A method comprising:
 receiving, by a first function, prior to the first function being restored, subscription information relating to a second function;
 sending, prior to the first function being restored, the subscription information relating to the second function to a server;
 restoring the first function, wherein the restoring comprises receiving the subscription information relating to the second function and updated subscriber information relating to a user equipment from the server; and
 after the first function is restored, sending, by the first function, the updated subscriber information relating to the user equipment to the second function based on the subscription information relating to the second function.

9. The method of claim 8, wherein the first function comprises a serving call session control function, the server comprises a home subscription server, and the second function comprises a proxy call session control function.

10. The method of claim 8, wherein the restoring of the first function is triggered by a call terminating at or originating from the user equipment.

11. The method of claim 8, wherein the updated subscriber information relating to the user equipment comprises at least one of a user equipment identity, a service priority and an extended priority.

12. The method of claim 8, further comprising:
    sending, by the first function, the updated subscriber information relating to the user equipment to the second function along with previous subscriber information relating to the user equipment.

13. The method of claim 12, wherein the updated subscriber information relating to the user equipment is sent by the first function to the second function along with the previous subscriber information relating to the user equipment in a notify message.

14. The method of claim 8, further comprising:
    restarting the first function after sending the subscription information relating to the second function to the server and prior to the first function being restored.

* * * * *